US012128672B2

(12) United States Patent
Yumoto et al.

(10) Patent No.: US 12,128,672 B2
(45) Date of Patent: Oct. 29, 2024

(54) RECORDING DEVICE

(71) Applicant: SEIKO EPSON CORPORATION, Tokyo (JP)

(72) Inventors: Yuya Yumoto, Shiojiri (JP); Junpei Yamashita, Azumino (JP); Osamu Murayama, Yamagata-mura (JP); Shinya Yamazaki, Asahi-mura (JP); Nobuaki Kamiyama, Matsumoto (JP); Shigenori Nakagawa, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 112 days.

(21) Appl. No.: 17/931,798

(22) Filed: Sep. 13, 2022

(65) Prior Publication Data

US 2023/0079017 A1 Mar. 16, 2023

(30) Foreign Application Priority Data

Sep. 15, 2021 (JP) ................................ 2021-150052

(51) Int. Cl.
*B41J 11/00* (2006.01)

(52) U.S. Cl.
CPC .................................. *B41J 11/009* (2013.01)

(58) Field of Classification Search
CPC ........ B41J 29/38; B41J 29/393; B41J 11/009; B41J 11/0095
See application file for complete search history.

(56) References Cited

U.S. PATENT DOCUMENTS

| | | | | |
|---|---|---|---|---|
| 2018/0238799 A1 | 8/2018 | Namiki et al. | | |
| 2019/0193423 A1 | 6/2019 | Morita | | |
| 2020/0240843 A1 | 7/2020 | Kanai et al. | | |
| 2021/0162775 A1 | 6/2021 | Kayahara | | |
| 2021/0243310 A1 | 8/2021 | Sasaki | | |
| 2022/0382201 A1 * | 12/2022 | Imaizumi | ................. | B65H 7/14 |

FOREIGN PATENT DOCUMENTS

JP 2021-084359 A 6/2021

* cited by examiner

*Primary Examiner* — Scott A Richmond
(74) *Attorney, Agent, or Firm* — WORKMAN NYDEGGER

(57) ABSTRACT

A recording device includes a recording unit configured to perform recording by ejecting a liquid onto a medium configured to transmit an ultrasonic wave, a transport unit configured to transport the medium, an imaging unit configured to capture an image of the medium, an ultrasonic wave sensor including a transmission unit configured to transmit an ultrasonic wave to the medium and a reception unit configured to receive an ultrasonic wave transmitted by the transmission unit, and a control unit configured to control an operation of the recording unit, based on an imaging result from the imaging unit and a detection result from the ultrasonic wave sensor. The transmission unit and the reception unit are positioned sandwiching the medium.

6 Claims, 9 Drawing Sheets

RECORDING DEVICE

The present application is based on, and claims priority from JP Application Serial Number 2021-150052, filed Sep. 15, 2021, the disclosure of which is hereby incorporated by reference herein in its entirety.

BACKGROUND

1. Technical Field

The present disclosure relates to a recording device.

2. Related Art

Hitherto, there has been known a device that captures an image of fabric with a camera or the like and performs printing as described in JP-A-2021-84359.

However, the device described in JP-A-2021-84359 is only capable of capturing a fabric surface with a camera, and hence the appropriate printing may not be performed.

SUMMARY

A recording device includes a recording unit configured to perform recording by ejecting a liquid onto a medium configured to transmit an ultrasonic wave, a transport unit configured to transport the medium, an imaging unit configured to capture an image of the medium, an ultrasonic wave sensor including a transmission unit configured to transmit an ultrasonic wave to the medium and a reception unit configured to receive an ultrasonic wave transmitted by the transmission unit, and a control unit configured to control an operation of the recording unit, based on an imaging result from the imaging unit and a detection result from the ultrasonic wave sensor, wherein the transmission unit and the reception unit are positioned sandwiching the medium.

DESCRIPTION OF EXEMPLARY EMBODIMENTS

Figure 1:
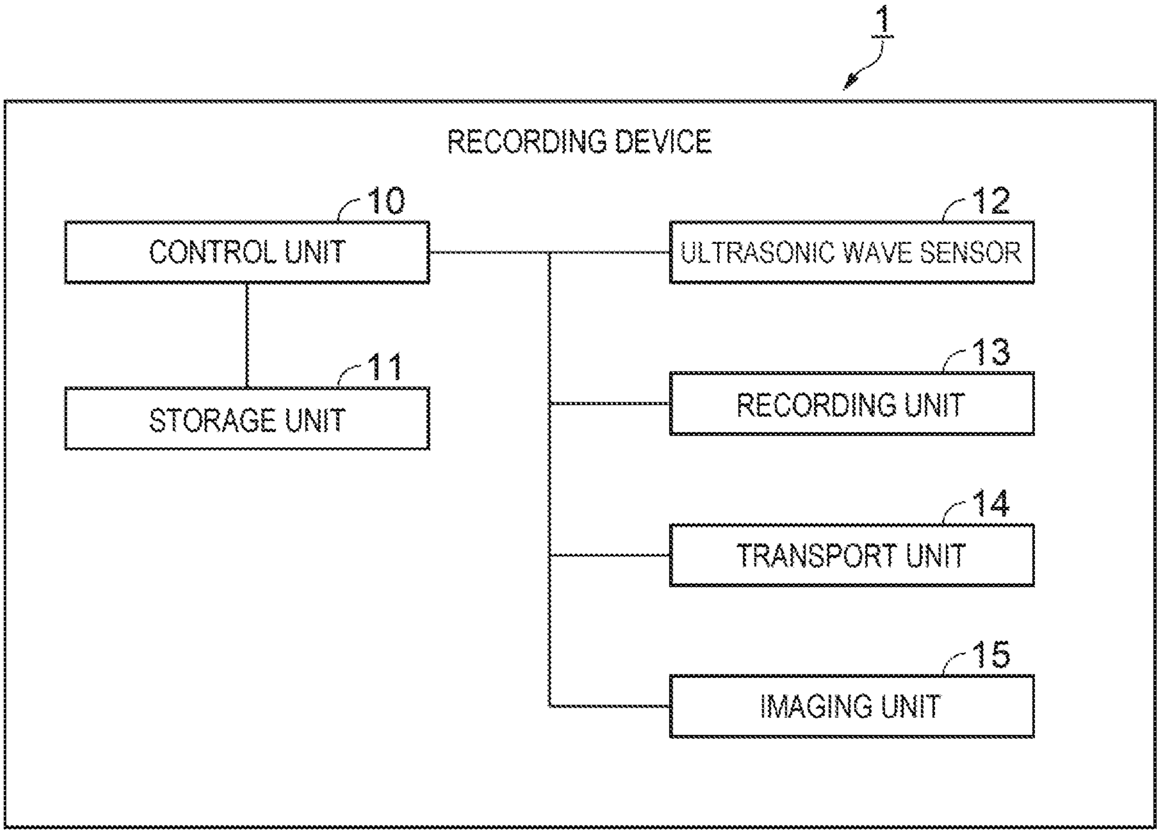
FIG. 1 is a block diagram illustrating a configuration of a recording device according to a first exemplary embodiment.

Exemplary embodiments are described below with reference to the accompanying figures. Note that the directions in the drawings are described through use of a three-dimensional coordinate system in which an X axis, a Y axis, and a Z axis are orthogonal to one another. Herein, it is assumed that a direction extending along the X axis, a direction extending along the Y axis, and a direction extending along the Z axis are an X direction, a Y direction, and a Z direction, respectively. For convenience of description, a positive direction of the Z direction is referred to as an upward direction or simply as upward and a negative direction thereof is referred to as a downward direction or simply as downward, a positive direction of the X direction is referred to as a rightward direction or simply as rightward and a negative direction thereof is referred to as a leftward direction or simply as leftward, and a positive direction of the Y direction is referred to as a frontward direction or simply as frontward and a negative direction thereof is referred to as a rearward direction or simply as rearward.

1. Recording Device According to First Exemplary Embodiment

Figure 2:
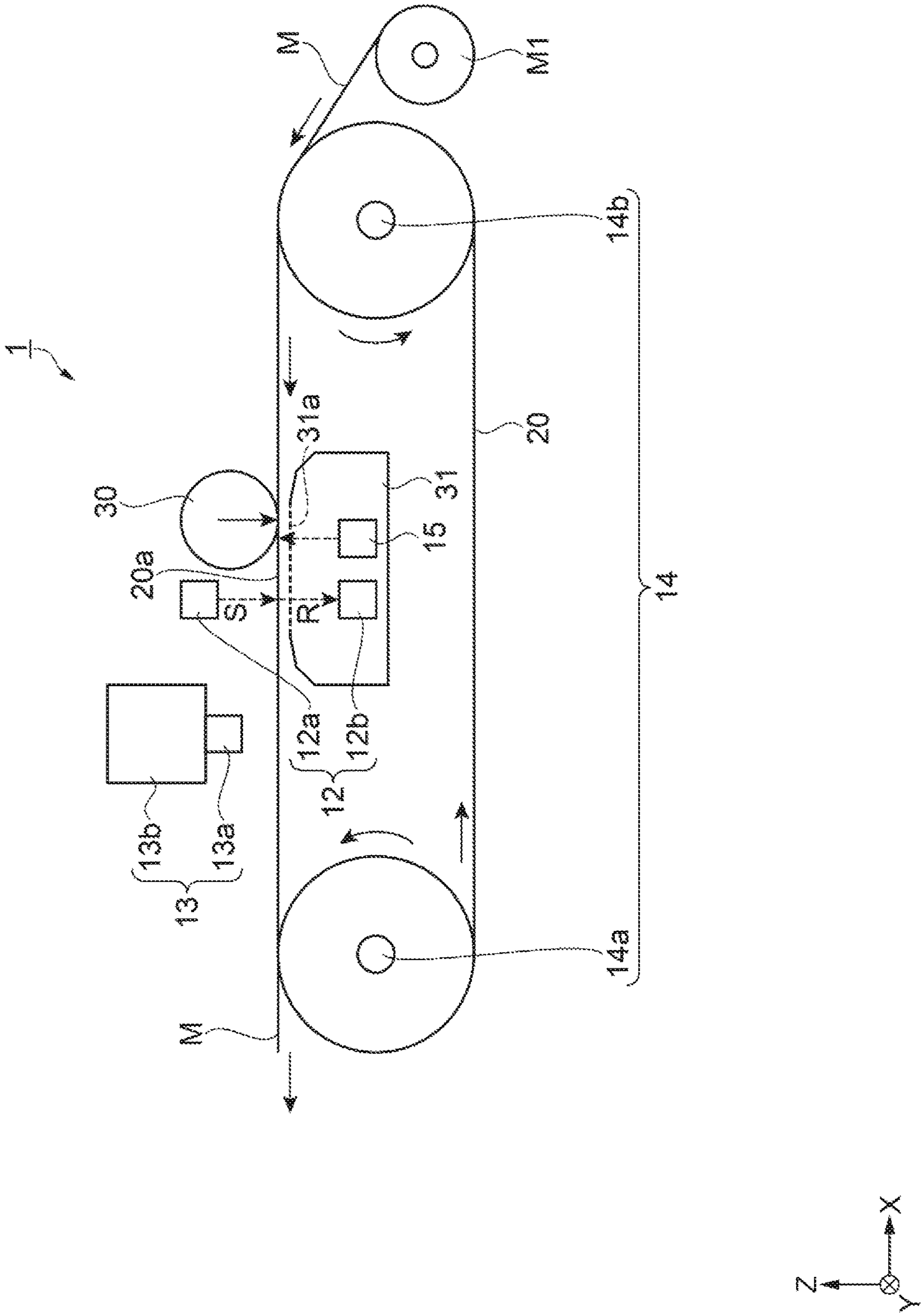
FIG. 2 is a schematic diagram illustrating the configuration of the recording device according to the first exemplary embodiment.

As illustrated in FIG. 1, a recording device 1 according to a first exemplary embodiment includes a control unit 10, a storage unit 11, an ultrasonic wave sensor 12, a recording unit 13, a transport unit 14, and an imaging unit 15. With reference also to FIG. 2, a configuration of the recording device 1 is described.

The control unit 10 includes a Central Processing Unit (CPU) that collectively controls the respective units of the recording device 1, a Universal Asynchronous Receiver Transmitter (UART) that controls an input and an output, a logic circuit such as a Field Programmable Gate Array (FPGA) and a Programmable Logic Device (PLD), and the like. The CPU is also simply referred to as a processor. The storage unit 11 includes re-writable non-volatile memory such as a flash Read Only Memory (ROM) and a Hard Disk Drive (HDD), a volatile memory such as a Random Access Memory (RAM), and the like.

The CPU of the control unit 10 reads a program such as firmware stored in the non-volatile memory of the storage unit 11, and executes the program by using the RAM of the storage unit 11 as a working region.

As an example, a medium M illustrated in FIG. 2 is an elongated fiber formed of natural fibers or synthetic fibers, and an ultrasonic wave can pass the medium M. The elongated fiber is also referred to as an original fabric. The recording device 1 performs recording on the medium M. Recording on a fiber is also referred to as textile printing, and the medium M is also referred to as a textile-printed material.

As illustrated in FIG. 2, the transport unit 14 includes an endless transporting belt 20, a driving roller **14*a* being a first roller, and a driven roller 14*b* being a second roller. The transporting belt 20 is stretched over the driving roller 14*a* and the driven roller 14*b***.

The transport unit 14 rotates the driving roller **14*a* in a counterclockwise direction by a transport motor, which is not illustrated. Along with this, the driven roller 14*b* is rotated in a counterclockwise direction. The transporting belt 20 stretched over the driving roller 14***a* and the driven roller 14*b* also revolves in a counterclockwise direction, that is a revolving direction. Note that a driving-driven relationship between the driving roller 14*a* and the driven roller 14*b* may be inverted.

The medium M drawn from a roll body M1 wound in a roll shape is placed on the transporting belt 20 of the transport unit 14 and is transported, under control of the control unit 10.

Figure 3:
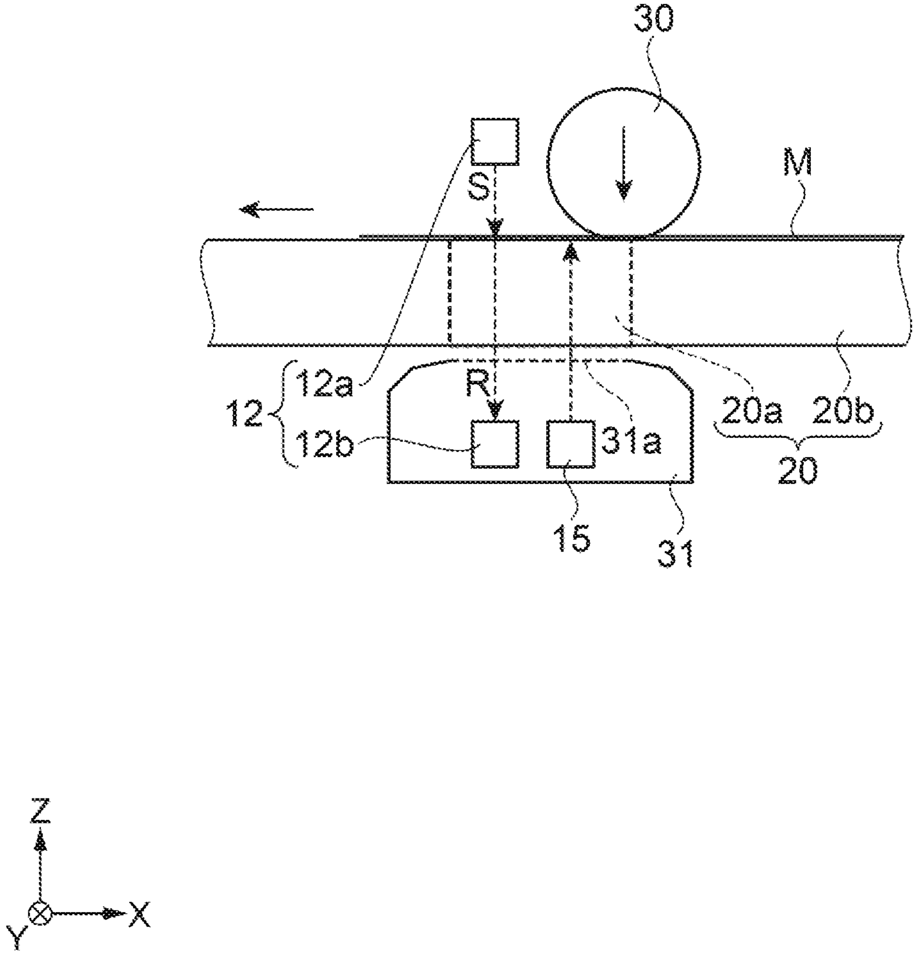
FIG. 3 is a schematic diagram illustrating a part corresponding to an ultrasonic wave sensor and an imaging unit in FIG. 2, in an enlarged manner.

As illustrated in FIG. 2 and FIG. 3, the recording device 1 includes the imaging unit 15 and a reception unit 12*b* of the ultrasonic wave sensor 12, which is described later, at positions below the transporting belt 20 on which the medium M is placed. The recording device 1 includes the recording unit 13 and a transmission unit 12*a* of the ultrasonic wave sensor 12, which is described later, at positions above the transporting belt 20 on which the medium M is placed. Note that a positional relationship between the transmission unit 12*a* and the reception unit 12*b* of the ultrasonic wave sensor 12 may be inverted.

The imaging unit 15, the ultrasonic wave sensor 12, and the recording unit 13 are positioned between the driving roller 14*a* and the driven roller 14*b*.

In the revolving direction of the transporting belt 20 with the position of the driven roller 14*b* as a reference, the imaging unit 15, the ultrasonic wave sensor 12, and the recording unit 13 are arranged in the stated order from upstream to downstream. An order opposite to the above-mentioned order corresponds to an order from downstream to upstream in the revolving direction of the transporting belt 20. Note that the imaging unit 15 and the ultrasonic wave sensor 12 may be inverted in the order.

Figure 4:
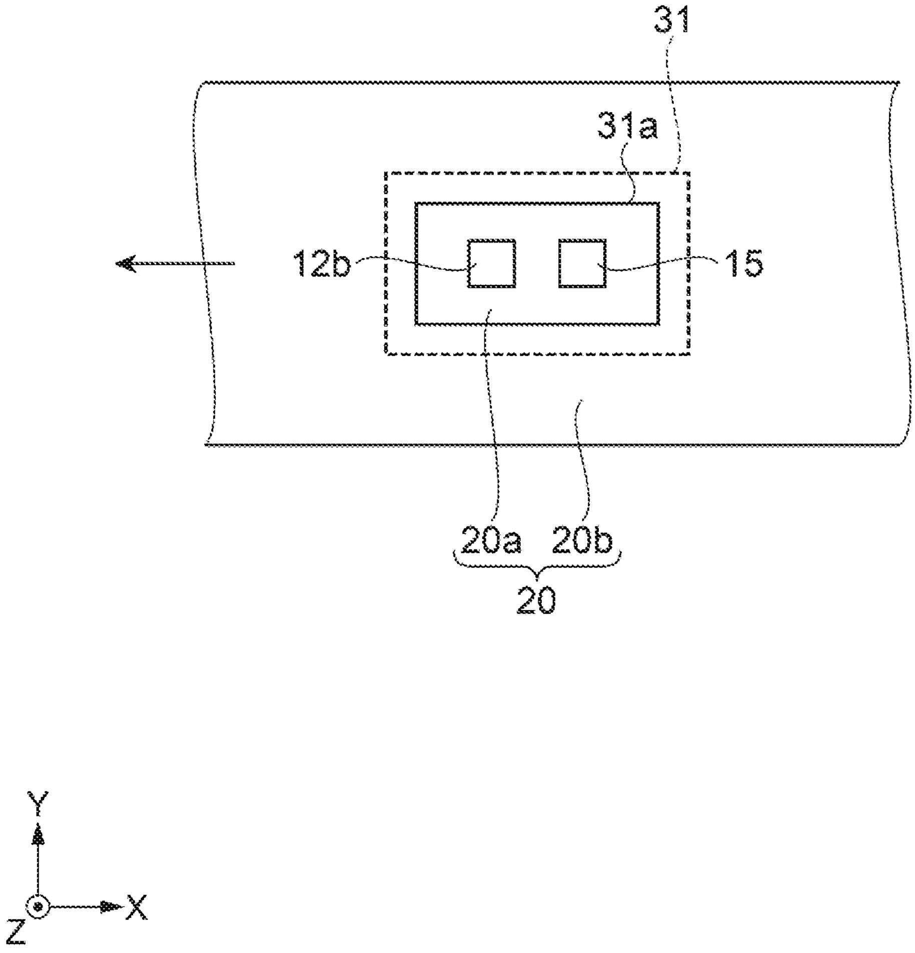
FIG. 4 is a schematic diagram obtained by viewing FIG. 3 in a direction from a recording unit.

As illustrated in FIG. 2, FIG. 3, and FIG. 4, a first opening portion 20*a* being an opening and a first opening is provided in the transporting belt 20 in the up-and-down direction being a thickness direction at a predetermined interval along the revolving direction of the transporting belt 20.

An ultrasonic wave of the ultrasonic wave sensor 12 can pass through the first opening portion 20*a*. The imaging unit 15 is capable of capturing an image of the medium M from below through the first opening portion 20*a*.

Note that the support portion 20*b* of the transporting belt 20 illustrated in FIG. 3 and FIG. 4 is a portion that does not have the first opening portion 20*a* and is a portion capable of supporting the medium M placed thereon.

A glue being an adhesive having adhesiveness is provided on the front surface of the support portion 20*b* of the transporting belt 20, and is capable of attracting the medium M. The glue includes a silicone resin, for example.

An electrification device that electrifies the front surface of the support portion 20*b* of the transporting belt 20 may be provided. This is a so-called electrostatic belt that electrifies the front surface of the support portion 20*b*. With this, the medium M can be attracted. Note that, in the recording device 1, at least either of the glue or the electrification device is provided to the support portion 20*b*.

With this configuration, the transporting belt 20 is capable of attracting the medium M and transporting the medium M in a stabilized manner. As a result, accuracy of imagining performed by the imaging unit 15 and detection performed by the ultrasonic wave sensor 12 can be improved.

As illustrated in FIG. 2, the recording unit 13 includes an ink-jet type head 13*a* and a carriage 13*b*. The recording unit 13 is provided at a position facing the transporting belt 20 on which the medium M is placed.

The carriage 13*b* includes a carriage motor. An ink cartridge or an ink tank can be mounted to the recording device 1. The ink cartridge or the ink tank stores ink of respective colors including Cyan, Magenta, Yellow, and Black (C, M, Y, and K) being ink colors, for example.

The recording unit 13 includes a supply mechanism that supplies ink from the ink cartridge or the like to the head. The supply mechanism supplies ink of the respective colors from the ink cartridge or the like to the corresponding nozzles of the head 13*a*.

The head 13*a* is mounted to the carriage 13*b* and is driven by the carriage motor to reciprocate above the medium M in the front-and-rear direction together with the carriage 13*b*. The head 13*a* is capable of performing recording by ejecting an ink droplet being a liquid from a nozzle onto the medium M while moving above the medium M under control of the control unit 10 based on recorded data. The recorded data is stored in the storage unit 11. The recorded data may be read from a storage medium by a reading unit included in the storage unit 11 or may be acquired from an external device.

Note that the ink colors may include, for example gradations of C, M, Y, and K, and hence may include any combination of four or more colors.

The head 13*a* may include a nozzle that ejects a penetrant liquid onto the medium M. The penetrant liquid is a liquid that promotes penetration of an ink droplet, which adheres to the front surface of the medium M, to the back surface thereof.

As illustrated in FIG. 2 and FIG. 3, the ultrasonic wave sensor 12 includes the transmission unit 12*a* being a transmitter that transmits a transmission wave S and the reception unit 12*b* being a receiver that receives a reception wave R. The ultrasonic wave sensor 12 uses an ultrasonic wave from 30 kHz to 10 MHz, for example.

The transmission unit 12*a* and the reception unit 12*b* of the ultrasonic wave sensor 12 are arranged above the transporting belt 20 and below the transporting belt 20, respectively, so as to sandwich the transporting belt 20 on which the medium M is placed. The ultrasonic wave sensor 12 is a so-called transmissive sensor in which the transmission unit 12*a* transmits the transmission wave S to the medium M and the reception unit 12*b* receives the reception wave R having passed through the medium M.

An ultrasonic wave of the ultrasonic wave sensor 12 can pass through the first opening portion 20*a* of the transporting belt 20. Specifically, the transmission unit 12*a* and the reception unit 12*b* are positioned sandwiching the medium M via the first opening portion 20*a*.

The imaging unit 15 is formed of a camera including a solid imaging element such as a Charge Coupled Device (CCD) image sensor. The imaging unit 15 may include an illumination unit that irradiates the medium M with illumination light. The imaging unit 15 is capable of capturing an image of the medium M from below through the first opening portion 20*a* of the transporting belt 20.

As illustrated in FIG. 2, a pressing unit 30 presses a part of the medium M placed and supported on the support portion 20*b* of the transporting belt 20, against the transporting belt 20. The pressed part of the medium M is upstream of the recording unit 13 in the revolving direction of the transporting belt 20. The pressing unit 30 is a pressure roller, for example. The pressing unit 30 may be reciprocable in a transport direction of the medium M and an opposite transport direction being a direction opposite to the transport direction.

A supporting member 31 is provided at a position facing the pressing unit 30 across the transporting belt 20. The supporting member 31 supports the transporting belt 20 by sandwiching the transporting belt 20 together with the pressing unit 30. The supporting member 31 is a so-called platen for bearing a load from the pressing unit 30.

The imaging unit 15 is capable of capturing an image of the medium M having passed through the position of the pressing unit 30, and the ultrasonic wave sensor 12 is capable of detecting the medium M having passed through the position of the pressing unit 30.

The medium M is sandwiched between the pressing unit 30 and the supporting member 31, is brought into closer contact with the transporting belt 20, and hence is transported in a more stabilized manner. As a result, accuracy of imagining performed by the imaging unit 15 and detection performed by the ultrasonic wave sensor 12 with respect to the medium M can further be improved.

As illustrated in FIG. 2 and FIG. 3, the supporting member 31 is capable of accommodating the imaging unit 15 and the reception unit 12*b* of the ultrasonic wave sensor 12 inside.

The imaging unit 15 and the ultrasonic wave sensor 12 are accommodated in the supporting member 31, so that an influence of an external environment where the recording device 1 is installed, such as ambient light and a noise can be suppressed. The supporting member 31 have both functions of supporting the transporting belt 20 and accommodating the imaging unit 15 and the ultrasonic wave sensor 12. With this, the recording device 1 can be reduced in size.

A second opening portion 31*a* being a second opening that is opened toward the transporting belt 20 is provided in the supporting member 31.

As illustrated in FIG. 3 and FIG. 4, when, along with the move of the transporting belt 20, the position of the first opening portion 20*a* of the transporting belt 20 is moved to overlap with the position of the second opening portion 31*a* of the supporting member 31, the second opening portion 31*a* and the first opening portion 20*a* are communicable with each other in the up-and-down direction. Note that, in FIG. 4, illustration is given without the medium M.

In the following description, a part where the second opening portion 31*a* and the first opening portion 20*a* overlap with each other and are communicating with each other in the up-and-down direction is referred to as an opening part. The constituent members of the recording device 1, which block an ultrasonic wave or light, are not provided in the opening part, and hence an ultrasonic wave or light can pass therethrough. There can be obtained a state in which only the medium M is present in the opening part.

When the medium M is placed on the transporting belt 20, and the first opening portion 20*a* and the second opening portion 31*a* are communicating with each other, the imaging unit 15 is capable of capturing an image of the medium M in an upward manner, the medium M being exposed from the opening part.

Simultaneously, the reception unit 12*b* of the ultrasonic wave sensor 12 is capable of receiving, as the reception wave R, an ultrasonic wave that is transmitted by the transmission unit 12*a* through the opening part, passes through the medium M, and enters from above.

Note that whether the first opening portion 20*a* and the second opening portion 31*a* are communicating with each other may be determined by the control unit 10, based on a moving amount of the transporting belt 20. Alternatively, a sensor (optical sensor or the like) that is different from the ultrasonic wave sensor 12 and the imaging unit 15 may be additionally arranged, and the control unit 10 may perform the determination based on a detection result from the sensor. The sensor may be a second reception unit that is provided to the same side as the transmission unit 12*a* with respect to the medium M, for example. The second reception unit is a receiver that receives the reception wave R and is different from the reception unit 12*b*.

As described above, for example, the ultrasonic wave sensor 12 is capable of detecting transmission of an ultrasonic wave with respect to the medium M through the first opening portion 20*a* of the transporting belt 20 and the second opening portion 31*a* of the supporting member 31. For example, the imaging unit 15 is capable of capturing an image of a mesh of the medium M.

Note that, when the imaging unit 15 includes the illumination unit, the pressing unit 30 may be positioned above the imaging unit 15. In this case, the pressing unit 30 may be prevented from being present between the transmission unit 12*a* and the reception unit 12*b*. With this, for example, when the medium M has high translucency, degradation of imaging accuracy of the imaging unit 15, which is caused by excessive backlight, can be prevented. Moreover, transmission of an ultrasonic wave to the medium M is less hindered. When the pressing unit 30 reciprocates in the transport direction of the medium M and the opposite transport direction, the pressing unit 30 may be positioned between the transmission unit 12*a* and the reception unit 12*b* along with the reciprocation motion. In this case, the control unit 10 may control an operation of the recording unit 13, based on a reception result from the reception unit 12*b* at a timing when the pressing unit 30 is not present between the transmission unit 12*a* and the reception unit 12*b* due to the reciprocation motion. In order to perform the above-mentioned control, the recording device 1 may include a detection unit capable of detecting a position of the pressing unit 30 in the transport direction.

As described later, the control unit 10 is capable of controlling an operation of the recording unit 13, based on an imaging result from the imaging unit 15 and a detection result from the ultrasonic wave sensor 12.

2. Control Method for Recording Device

Figure 5:
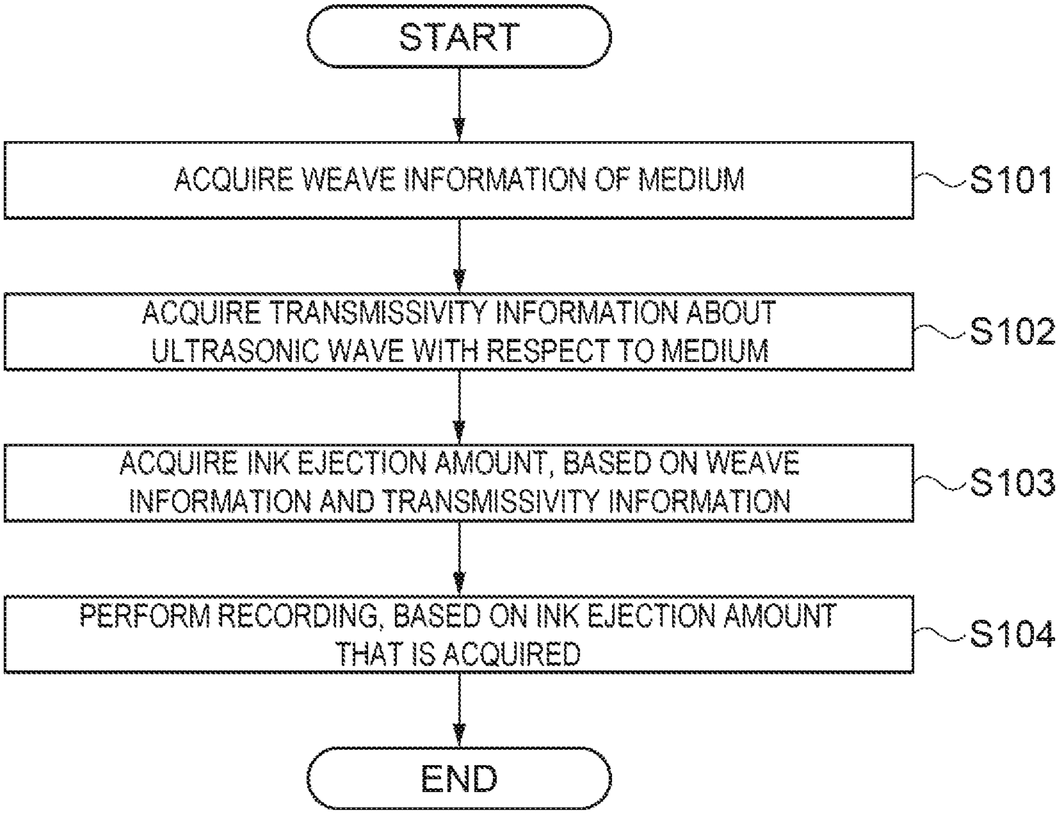
FIG. 5 is a flowchart illustrating one example of a control method of a control unit.
Figure 6:
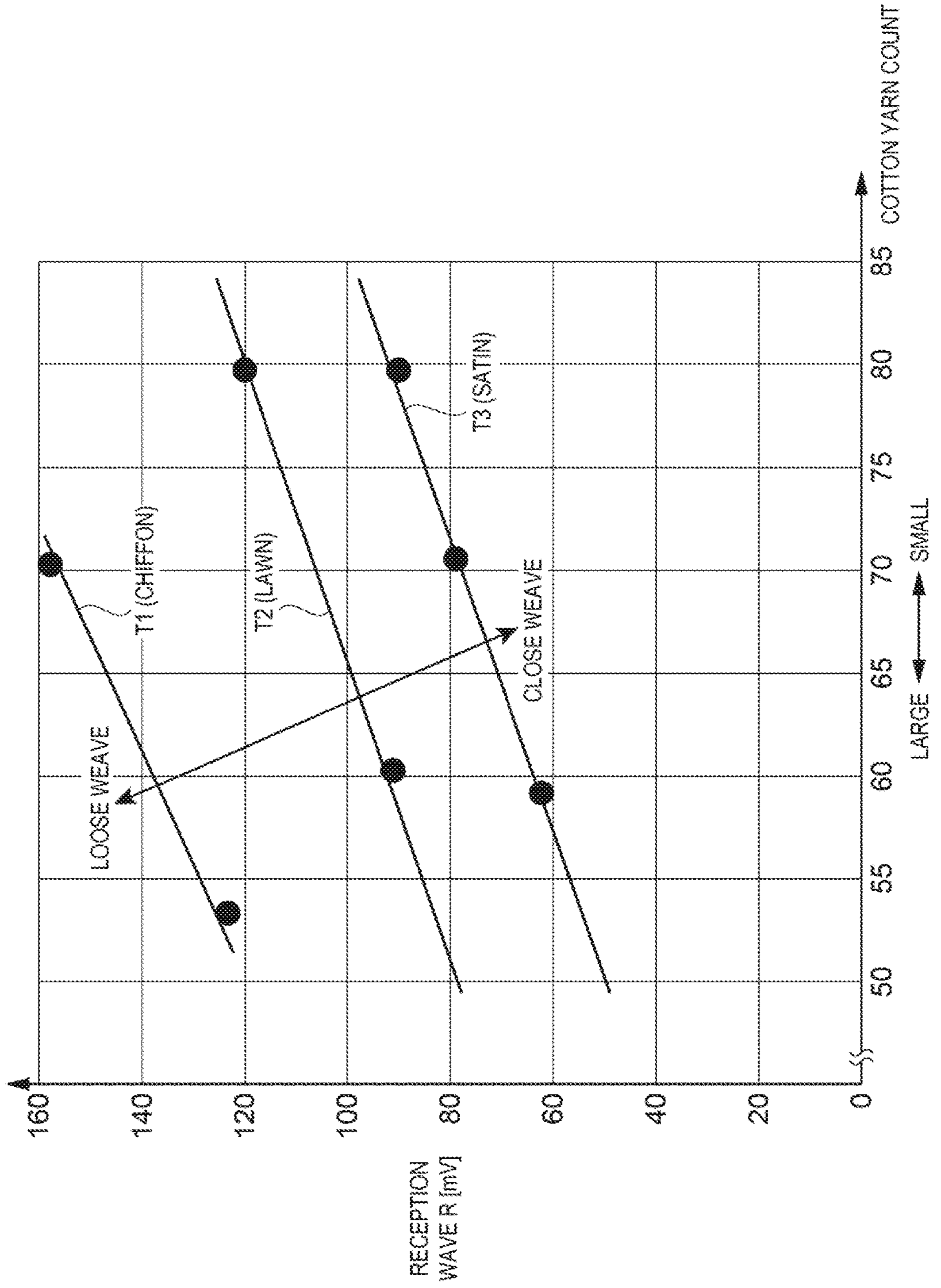
FIG. 6 is a diagram illustrating an example of a relationship between a type of woven fabric of a medium, transmissivity information about an ultrasonic wave, and mesh information.
Figure 7:
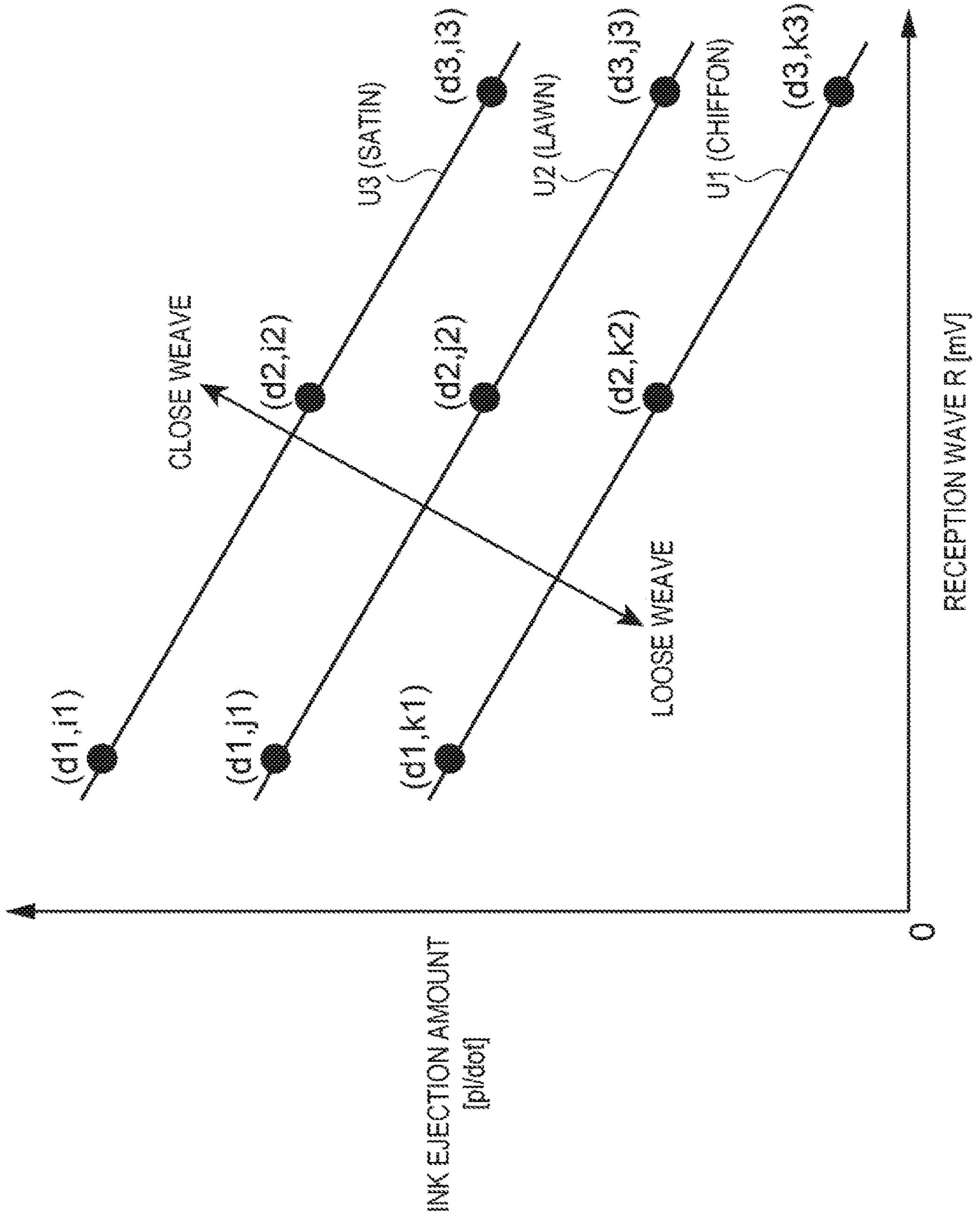
FIG. 7 is a characteristic diagram illustrating an example of a relationship between a type of woven fabric of a medium, transmissivity information about an ultrasonic wave, and an ink ejection amount.

With reference mainly to the flowchart in FIG. 5 as well as reference to FIG. 6 and FIG. 7, a control method for the recording device 1 is described.

The control unit 10 causes the transport unit 14 to draw the medium M from the roll body M1 wound in a roll shape, place the medium M on the transporting belt 20 of the transport unit 14, and transport the medium M.

The medium M is attracted on the transporting belt 20 due to the glue or the like provided on the front surface of the transporting belt 20. Further, the medium M is transported, is sandwiched between the pressing unit 30 and the supporting member 31, and is brought into close contact with the transporting belt 20.

When, along with the move of the transporting belt 20 by the transport unit 14, the position of the first opening portion 20*a* of the transporting belt 20 arrives at the position of the second opening portion 31*a* of the supporting member 31 and overlaps therewith, the second opening portion 31*a* is capable of communicating with the first opening portion 20*a*. There is obtained a state in which only the medium M is present in the opening part.

When the first opening portion 20*a* and the second opening portion 31*a* are communicating with each other, the control unit 10 causes the imaging unit 15 to capture an image of the medium M through the opening part and acquire imaging information being an imaging result.

The control unit 10 subjects image processing such as edge detection to the acquired imaging information to extract a weave pattern of the fibers of the medium M.

Weave patterns of the medium M and a plurality of pieces of weave information corresponding to the weave patterns are stored in the storage unit 11. The control unit 10 compares the weave pattern of the medium M extracted by the imaging unit 15, and the plurality of weave patterns stored in the storage unit 11 with each other. The control unit 10 specifies a weave pattern in the storage unit 11, which is closest to the extracted weave pattern, and acquires weave information corresponding to the specified weave pattern (S101).

The weave information acquired by the control unit 10 includes information about a type of woven fabric, the information relating to density of the weave. As illustrated in FIG. 6, the information indicating a type of woven fabric includes information indicating, for example, chiffon, lawn, or satin in the order from a loose weave to a close weave of the fibers of the medium M, for example.

When the first opening portion 20*a* and the second opening portion 31*a* are communicating with each other, the control unit 10 causes the transmission unit 12*a* of the ultrasonic wave sensor 12 to transmit the transmission wave S to the medium M and causes the reception unit 12*b* to receive the reception wave R having passed through the medium M.

A voltage of the reception wave R received by the reception unit 12*b*, which is indicated with the vertical axis in FIG. 6, is a detection result from the ultrasonic wave sensor 12, and indicates transmissivity information about an ultrasonic wave with respect to the medium M. The control unit 10 causes the reception unit 12*b* to acquire the transmissivity information about an ultrasonic wave with respect to the medium M (S102).

Mesh information corresponds to the transmissivity information about an ultrasonic wave for each type of woven fabric. Specifically, the mesh information corresponds to the voltage of the reception wave R received by the reception unit 12*b*, which is the transmissivity information about an ultrasonic wave, for each of woven fabric types such as chiffon, lawn, and satin. The voltage of the reception wave R received by the reception unit 12*b* corresponds to the mesh information being information relating to a so-called cotton yarn count indicating a size of the mesh of the medium M.

Those relationships are illustrated in FIG. 6. The horizontal axis in FIG. 6 indicates the cotton yarn count. Note that the cotton yarn count has a smaller value for a larger mesh of the medium M, which indicates that the medium M is thick.

As illustrated in FIG. 6, when the medium M has a looser weave as in the case of chiffon, or has a smaller mesh and a larger cotton yarn count, the voltage of the reception wave R is increased. Thus, an ultrasonic wave tends to easily pass through the medium M. The dots in FIG. 6 indicate a value obtained by measuring the voltage of the reception wave R with respect to a size of the mesh of the medium M for each of woven fabric types such as chiffon, lawn, and satin. Curves T1, T2, and T3 are approximation curves calculated for chiffon, lawn, and satin, respectively, based on these dots.

Through use of the relationships of these approximation curves, the control unit 10 controls an operation of the recording unit 13. The storage unit 11 stores the relationships of these approximation curves.

As described above, when the position of the first opening portion 20*a* of the transporting belt 20 overlaps and is communicating with the position of the second opening portion 31*a* of the supporting member 31, the control unit 10 acquires the weave information including the information about a type of woven fabric, based on the imaging information acquired by the imaging unit 15. Moreover, the control unit 10 acquires the mesh information indicating the size of the mesh of the medium M for each piece of the weave information. The mesh information corresponds to the transmissivity information about an ultrasonic wave being the voltage of the reception wave R received by the reception unit 12*b*.

Meanwhile, a degree of striking-through of ink differs depending on a type of woven fabric of the medium M. The looser the weave is, the more likely it is for the striking-through of ink to occur. Thus, an ink ejection amount from the recording unit 13 is preferably reduced.

The larger the size of the mesh of the medium M is, the thicker the medium M is, and the more the medium M tends to absorb ink. Thus, the ink ejection amount is preferably increased. Meanwhile, the smaller the size of the mesh of the medium M is, the less the medium M absorbs ink, leading the ink to tend to bleed. The smaller the size of the mesh of the medium M is, the more easily the ink bleeds. Thus, the ink ejection amount is preferably reduced.

The control unit 10 is only required to acquire the mesh information about the medium M, which corresponds to the transmissivity information about an ultrasonic wave, for each piece of the weave information while referring to the recording unit 13, and to acquire the ink ejection amount corresponding to the mesh information.

The mesh information corresponds to the transmissivity information about an ultrasonic wave. Therefore, the control unit 10 may acquire the ink ejection amount corresponding to the transmissivity information about an ultrasonic wave, through direct use of the transmissivity information about an ultrasonic wave instead of the mesh information, for each piece of the weave information.

In view of this, the control unit 10 is capable of acquiring the ink ejection amount, based on the weave information and the transmissivity information (S103).

For example, the storage unit 11 stores the ink ejection amount for each of woven fabric types such as chiffon, lawn, and satin, which is indicated in the weave information. The ink ejection amount corresponds to the voltage of the reception wave R received by the reception unit 12*b*, which is the transmissivity information about an ultrasonic wave. Those relationships are illustrated in FIG. 7. The ink ejection amount is indicated in pl/dot, that is, an ink amount per dot.

The ink ejection amount illustrated in FIG. 7 indicates a total ink amount of each ink color with respect to the corresponding dot. Note that the ink ejection amount illustrated in FIG. 7 may be an ink amount of ink of one specific color or a plurality of colors with respect to the corresponding dot.

The dots in FIG. 7 each indicate a value obtained by measuring the ink ejection amount appropriate for the voltage of the reception wave R received by the reception unit 12*b*, which is the transmissivity information about an ultrasonic wave, for each of woven fabric types of the medium M such as chiffon, lawn, and satin.

In the case of chiffon having a loose weave, the appropriate ink ejection amount is smaller than those of other woven fabrics. As the voltage of the reception wave R received by the reception unit 12*b* is increased in the order of d1, d2, and d3, the size of the mesh of the medium M is smaller. Thus, the appropriate ink ejection amount is reduced in the order of k1, k2, and k3. Similarly, in the case of lawn having a wave between that of chiffon and that of satin, the appropriate ink ejection amount is between that of chiffon and that of satin. As the voltage of the reception wave R received by the reception unit 12*b* is increased in the order of d1, d2, and d3, the size of the mesh of the medium M is smaller. Thus, the appropriate ink ejection amount is reduced in the order of j1, j2, and j3.

In the case of satin having a close weave, the appropriate ink ejection amount is larger than those of other woven fabric. As the voltage of the reception wave R received by the reception unit 12*b* is increased in the order of d1, d2, and d3, the size of the mesh of the medium M is smaller. Thus, the appropriate ink ejection amount is reduced in the order of i1, i2, and i3.

Curves U1, U2, and U3 illustrated in FIG. 7 indicate approximation curves for chiffon, lawn, and satin, respectively, based on these dots. Through use of the relationships of these approximation curves, the control unit 10 controls an operation of the recording unit 13. The storage unit 11 stores the relationships of these approximation curves.

The control unit 10 causes the recording unit 13 to perform recording on the medium M, based on the ink ejection amount acquired from the storage unit 11 (S104).

The ink ejection amount is set to an appropriate amount based on the weave information about the medium M and the transmissivity information, and thus appropriate recording can be performed on the medium M.

As described above, the control unit 10 is capable of controlling an operation of the recording unit 13, based on the imaging information, which is an imaging result from the imaging unit 15, and the voltage of the reception wave R received by the reception unit 12*b*, which is a detection result from the ultrasonic wave sensor 12.

Here, specifically, description is given on an example in which the control unit 10 sets the ink ejection amount appropriate for the medium M by controlling the head 13*a* of the recording unit 13.

For example, the control unit 10 increase electric power of a driving waveform to be applied to the head 13*a*, thereby increasing the ink ejection amount. At the time of forming dots, the control unit 10 applies a driving waveform to the head 13*a* for a plurality of times to eject an ink droplet for a plurality of times. With this, the ink ejection amount can also be increased.

Moreover, as the medium M has a closer weave or a larger mesh, the control unit 10 can also increase a velocity of an ink droplet by increasing a voltage of a driving waveform to be applied to the head 13*a*. In this case, the control unit 10 may increase a frequency of a driving waveform to increase the number of times for ejecting an ink droplet. The control unit 10 can also reduce a moving velocity of the carriage 13*b* to allow an ink droplet ejected to be easily absorbed by the medium M.

The control unit 10 executes at least one of the above-mentioned controls with respect to the head 13*a*, based on the mesh information about the medium M, which corresponds to the transmissivity information obtained by the ultrasonic wave sensor 12, in addition to the weave information about the medium M, which corresponds to the imaging information obtained by the imaging unit 15. With this, the ink ejection amount appropriate for the medium M can be set, and appropriate recording can be performed.

3. Recording Device According to Second Exemplary Embodiment

Figure 8:
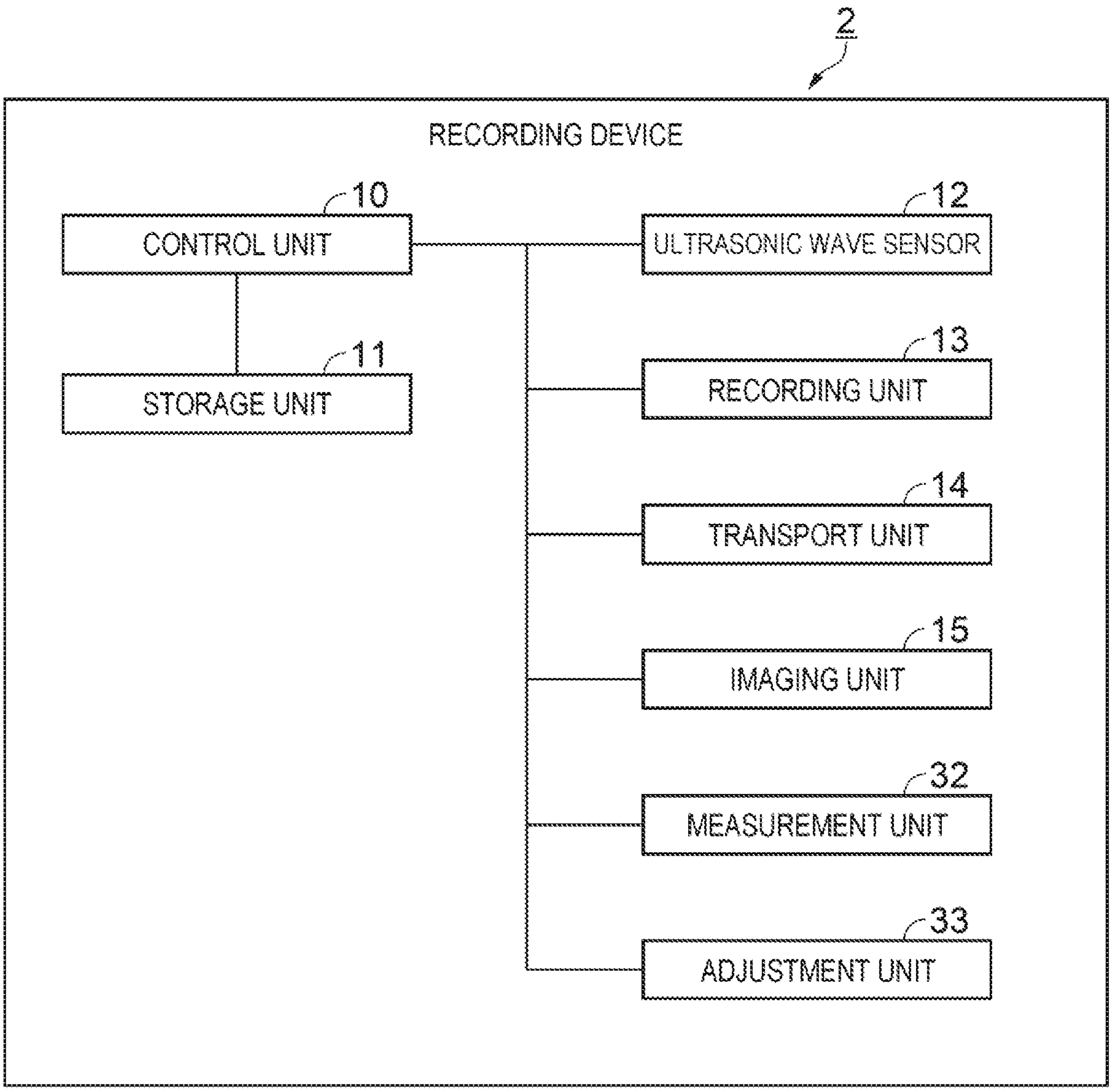
FIG. 8 is a block diagram illustrating a configuration of a recording device according to a second exemplary embodiment.

As illustrated in FIG. 8, a recording device 2 according to a second exemplary embodiment is obtained by adding a measurement unit 32 and an adjustment unit 33 to the recording device 1 according to the first exemplary embodiment, which is illustrated in FIG. 1, and changing the positions of the ultrasonic wave sensor 12 and the imaging unit 15. Note that the pressing unit 30 is eliminated.

Figure 9:
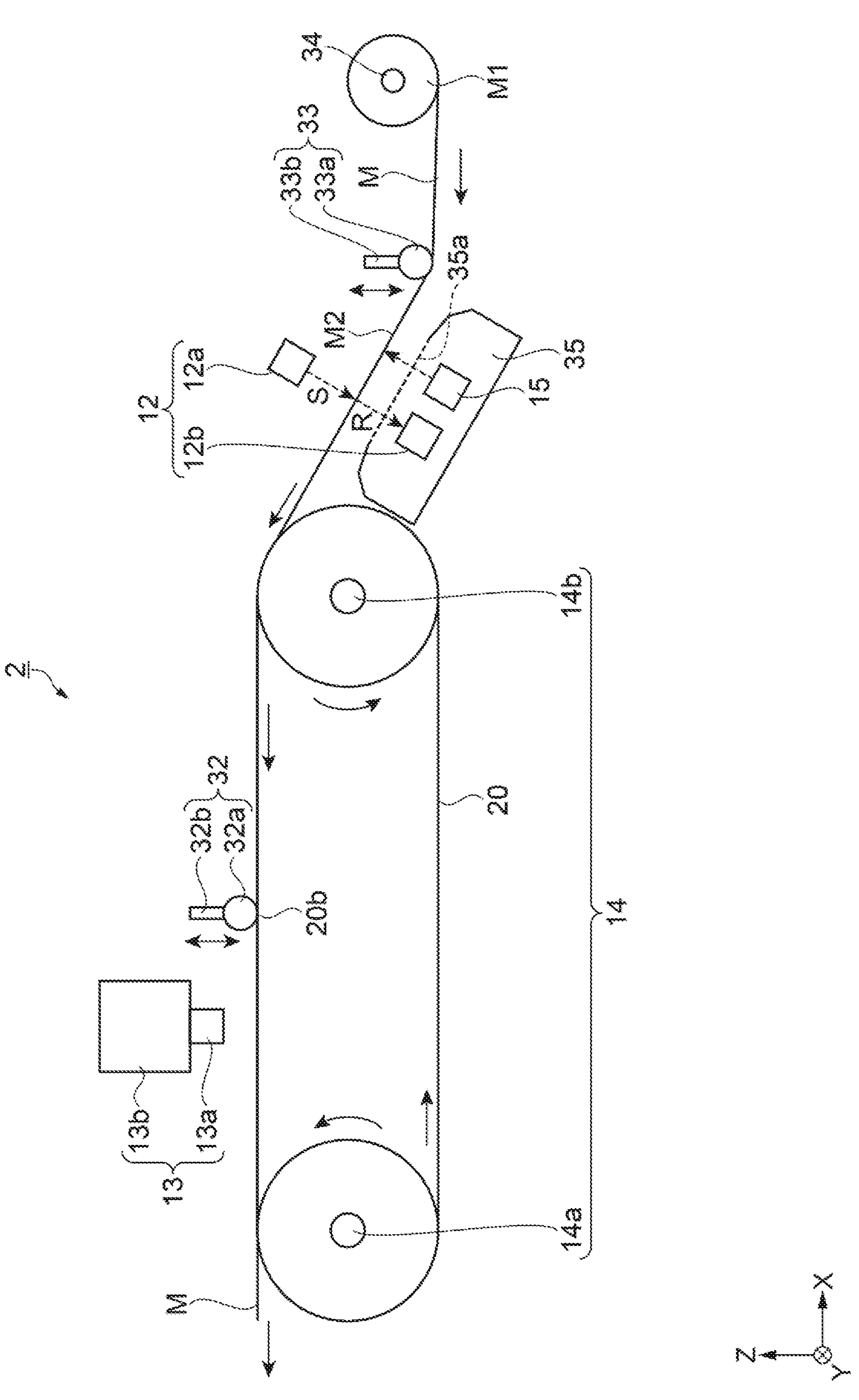
FIG. 9 is a schematic diagram illustrating the configuration of the recording device according to the second exemplary embodiment.

With reference also to FIG. 9, a configuration of the recording device 2 is described. Note that, in the constituent elements of the recording device 2 illustrated in FIG. 8 and FIG. 9, the same constituent elements as those of the recording device 1 illustrated in FIG. 1 are denoted with the same reference symbols.

As illustrated in FIG. 9, a holding unit 34 of the recording device 2 is capable of holding the roll body M1 obtained by winding the medium M in a roll shape. For example, a shaft is provided at the center of the roll body M1, and the holding unit 34 holds the roll body M1 in a rotatable manner.

The medium M is drawn out from the roll body M1 held by the holding unit 34 and is transported so as to arrive at the position at which the transporting belt 20 is stretched to the driven roller 14*b* of the transport unit 14, via the positions of the adjustment unit 33, the imaging unit 15, and the ultrasonic wave sensor 12.

A portion of the medium M from the position of the holding unit 34 to the position of the transporting belt 20 is referred to as an adjustment portion M2.

The adjustment unit 33 includes an adjustment roller 33*a* and a moving unit 33*b*. The adjustment roller 33*a* is brought into contact with the adjustment portion M2 while rotating, and thus is capable of applying a tension. The moving unit 33*b* includes a motor, and the motor of the moving unit 33*b* moves the position of the adjustment roller 33*a* with respect to the adjustment portion M2, under control of the control unit 10. With this, a tension of the adjustment portion M2 can be adjusted.

As illustrated in FIG. 9, the recording device 2 includes an accommodation unit 35 that has only an accommodation function, in place of the supporting member 31 of the recording device 1. The accommodation unit 35 is capable of accommodating the imaging unit 15 and the reception unit 12*b* of the ultrasonic wave sensor 12 inside. The accommodation unit 35 is provided between the position of the holding unit 34 and the position of the transporting belt 20.

A third opening portion 35*a*, which is opened toward the adjustment portion M2 of the medium M, is provided in the accommodation unit 35. The imaging unit 15 is capable of capturing an image of the adjustment portion M2 in an upward manner through the third opening portion 35*a*.

The transmission unit 12*a* and the reception unit 12*b* of the ultrasonic wave sensor 12 are positioned sandwiching the adjustment portion M2. The reception unit 12*b* of the ultrasonic wave sensor 12 is capable of receiving, as the reception wave R, an ultrasonic wave that is transmitted by the transmission unit 12*a* through the third opening portion 35*a*, passes through the adjustment portion M2, and enters from above.

As illustrated in FIG. 9, the measurement unit 32 is provided upstream of the recording unit 13 in the transport direction of the medium M. A portion of the transporting belt 20 on which the medium M is placed and supported is referred to as the support portion 20*b*. The measurement unit 32 is capable of measuring a tension of the support portion 20*b*.

The measurement unit 32 includes a measurement roller 32*a* and a tension measurement unit 32*b*. The measurement roller 32*a* is capable of moving to or from the support portion 20*b* in the up-and-down direction via the medium M while rotating. The tension measurement unit 32*b* includes a pressure sensor or a position detection sensor, and thus is capable of measuring a pressure received from the measurement roller 32*a* or a tension received from the support portion 20*b* by detecting a movement in the up-and-down direction. The tension measurement unit 32*b* is not particularly limited as long as a configuration capable of measuring a tension of the support portion 20*b* is provided.

The control unit 10 acquires, from the measurement unit 32, a measurement result from measuring a tension of the support portion 20*b* of the transporting belt 20. The control unit 10 controls the adjustment unit 33 to perform adjustment so that a tension of the adjustment portion M2 of the medium M is equal to a tension of the support portion 20*b*, which is the measurement result.

A tension of the support portion 20*b* of the transporting belt 20, which is measured by the measurement unit 32, is also a tension of the medium M on which the recording unit 13 performs recording. Meanwhile, a tension of the adjustment portion M2 of the medium M is a tension at the position at which the imaging unit 15 performs imaging and the ultrasonic wave sensor 12 performs detection.

The control unit 10 controls the measurement unit 32 and the adjustment unit 33. With this, for example, a tension of the medium M on which the recording unit 13 performs recording and a tension of the medium M at the position at which the imaging unit 15 performs imaging and the ultrasonic wave sensor 12 performs detection are substantially equal to each other.

The medium M at the position of the recording unit 13 is placed on the support portion 20*b* of the transporting belt 20. Thus, a tension measured by the measurement unit 32 may contain rigidity of the support portion 20*b*, and hence may tend to be higher than a tension of only the medium M at the positions of the imaging unit 15 and the ultrasonic wave sensor 12. In this case, the control unit 10 is only required to adjust the adjustment unit 33 so that a tension at the positions of the imaging unit 15 and the ultrasonic wave sensor 12 is lower than a tension measured by the measurement unit 32.

As a result of these actions, a state such as a weave and a mesh of the adjustment portion M2 of the medium M can be set to substantially the same as a state such as a weave and a mesh of the medium M on the support portion 20*b*.

In other words, when the imaging unit 15 performs imaging and the ultrasonic wave sensor 12 performs detection, the measurement unit 32 and the adjustment unit 33 are capable of causing a state of a tension of the adjustment portion M2 of the medium M to match with a state of a tension of the medium M at the position of the recording unit 13. Therefore, even when the imaging unit 15 performs imaging and the ultrasonic wave sensor 12 performs detection at a position different from the support portion 20*b*, that is, at the adjustment portion M2, degradation of accuracy of the imaging and detection can be suppressed. In particular, accuracy of the weave information about the medium M, which is acquired by the imaging unit 15, and accuracy of the mesh information about the medium M, which is acquired by the reception unit 12*b*, can be improved.

The control unit 10 improves accuracy of the mesh information about the medium M, which corresponds to the transmissivity information obtained by the ultrasonic wave sensor 12, as well as accuracy of the weave information about the medium M, which corresponds to the imaging information obtained by the imaging unit 15. Moreover, the ink ejection amount appropriate for the medium M can be set based on the weave information and the mesh information. With this, appropriate recording can be performed.

In the recording device 2, the imaging unit 15 performs imaging and the ultrasonic wave sensor 12 performs detection at the adjustment portion M2 of the medium M, which is not placed on the transporting belt 20. Therefore, the recording device 2 does not require the first opening portion 20*a* provided to the transporting belt 20, which is different from the recording device 1 according to the first exemplary embodiment.

Note that the configurations of the recording device 2 other than those described above are the same as the above-mentioned configurations of the recording device 1, and hence description therefor is omitted.

As described above, the recording devices 1 and 2 are capable of acquiring the ink ejection amount appropriate for the medium M, based on the weave information about the medium M, which corresponds to the imaging information obtained by the imaging unit 15, and the mesh information about the medium M, which corresponds to the transmissivity information obtained by the ultrasonic wave sensor 12. With this, appropriate recording can be performed.

The exemplary embodiments are described above in detail with reference to the drawings. However, the specific configurations are not limited to these exemplary embodiments, and changes, replacement, elimination, and the like may be made thereto without departing from the gist of the present disclosure.

For example, in the above-mentioned example, the recording unit 13 of the recording devices 1 and 2 is described as a serial type in which the head 13*a* is mounted to the carriage 13*b* and moves. However, the recording unit 13 may be a line type in which the head 13*a* is fixed without the carriage 13*b*. The types of woven fabric of the medium M may be other than chiffon, lawn, and satin. The transport unit 14 may include a feeding device at a position near the driven roller 14*b*. The feeding device draws the medium M out from the roll body M1. The transport unit 14 may include a winding device at a position near the driving roller 14*a*. The winding device winds the medium M peeled off the transporting belt 20. The recording devices 1 and 2 may include a cleaning device that cleans, with a cleaning liquid, the transporting belt 20 after the medium M on which recording has been performed is peeled off, a wiping device that wipes the cleaning liquid adhering to the transporting belt 20, a drying device that dries the cleaning liquid adhering to the transporting belt 20, an applying device that applies the glue on the transporting belt 20, or the like.

Contents derived from the exemplary embodiments describe above are described below.

The recording device 1 includes the recording unit 13 configured to perform recording by ejecting a liquid onto the medium M configured to transmit an ultrasonic wave, the transport unit 14 configured to transport the medium M, the imaging unit 15 configured to capture an image of the medium M, the ultrasonic wave sensor 12 including the transmission unit 12*a* configured to transmit an ultrasonic wave to the medium M and the reception unit 12*b* configured to receive an ultrasonic wave transmitted by the transmission unit 12*a*, and the control unit 10 configured to control an operation of the recording unit 13, based on an imaging result from the imaging unit 15 and a detection result from the ultrasonic wave sensor 12. The transmission unit 12*a* and the reception unit 12*b* are positioned sandwiching the medium M.

When the ultrasonic wave sensor 12 including the transmission unit 12*a* and the reception unit 12*b* that are positioned sandwiching the medium M is used, the recording device 1 is capable of detecting a thickness of the medium M, based on intensity of an ultrasonic wave received by the reception unit 12*b*. With the configuration described above, the control unit 10 is capable of controlling an operation of the recording unit 13 based on the information acquired by the ultrasonic wave sensor 12, that is, the information about the thickness of the medium M, as well as the information acquired by the imaging unit 15, that is, the information about the state of front surface of the medium M. An operation of the recording unit 13 includes, for example increasing a driving waveform voltage, which corresponds to a velocity of an ink droplet, for a thick medium M, increasing a frequency of a driving waveform, which corresponds to the number of times for ejecting ink, for a thick medium M, reducing a carriage velocity, which corresponds to quickness of ink to be absorbed, for a thick medium M, and the like. With these operations, for example, the recording device 1 is capable of controlling an ejection amount of an ink droplet, and thus an appropriate image in accordance with the medium M can be obtained.

In the recording device 1 described above, the transport unit 14 includes the transporting belt 20 having an endless shape, and the driving roller 14*a* and the driven roller 14*b* over which the transporting belt 20 is stretched, the recording unit 13 faces the transporting belt 20 stretched over the driving roller 14*a* and the driven roller 14*b*, the transporting belt 20 has the first opening portion 20*a* being an opening through which an ultrasonic wave transmitted by the transmission unit 12*a*, is configured to pass, when a portion of the transporting belt 20 that does not have the first opening portion 20*a* and supports the medium M is regarded as the support portion 20*b*, the support portion 20*b* is configured to attract the medium M, and the ultrasonic wave sensor 12 and the imaging unit 15 are positioned between the driving roller 14*a* and the driven roller 14*b*.

With the configuration described above, the recording device 1 is capable of acquiring an imaging result from the imaging unit 15 and a detection result from the ultrasonic wave sensor 12 under a tension condition close to the tension condition at the time of performing recording on the medium M by the recording unit 13. With this, control of a recording operation can be performed at higher accuracy.

The recording device 1 described above further includes the pressing unit 30 configured to press, against the transporting belt 20, a part of the medium M supported on the support portion 20*b*, the part being present upstream of the recording unit 13 in the revolving direction of the transporting belt 20, wherein the imaging unit 15 is configured to capture an image of the medium M after passing through the pressing unit 30, and the ultrasonic wave sensor 12 is configured to detect the medium M after passing through the pressing unit 30.

With the configuration described above, imaging and detection are performed under a state in which the medium M is brought into close contact with the transporting belt 20, that is, under a more stabilized state. Thus, the recording device 1 can further improve accuracy of an imaging result from the imaging unit 15 and an imaging and detection result from the ultrasonic wave sensor 12.

The recording device 1 described above further includes the supporting member 31 configured to support the transporting belt 20 by sandwiching the transporting belt 20 together with the pressing unit 30, wherein the supporting member 31 has the second opening portion 31*a* configured to be in communication with the first opening portion 20*a*, the imaging unit 15 and the reception unit 12*b* are accommodated in the supporting member 31, the imaging unit 15 is configured to capture an image of the medium M exposed from the first opening portion 20*a* and the second opening portion 31*a*, and the reception unit 12*b* receives an ultrasonic wave passed through the first opening portion 20*a* and the second opening portion 31*a*.

With the configuration described above, in the recording device 1, the supporting member 31 accommodates the imaging unit 15 and the reception unit 12*b* inside. Thus, an influence of an external environment where the recording device 1 is installed can be suppressed. The supporting member 31 also functions as an accommodation means that accommodates the imaging unit 15 and the reception unit 12*b*, and hence the recording device 1 can be reduced in size.

In the recording device 2, the transport unit 14 includes the transporting belt 20 having an endless shape, the recording device 2 further includes the adjustment unit 33 configured to adjust a tension of the adjustment portion M2 when a portion of the medium M from the holding unit 34 to the transporting belt 20 is regarded as the adjustment portion M2, the holding unit 34 being configured to hold the roll body M1 around which the medium M is wound, and the measurement unit 32 configured to measure a tension of the support portion 20*b* when a portion of the transporting belt 20 supporting the medium M is regarded as the support portion 20*b*, the control unit 10 controls the adjustment unit 33 based on a measurement result from the measurement unit 32 so that a tension of the adjustment portion M2 corresponds to a tension of the support portion 20*b*, the imaging unit 15 is configured to capture an image of the adjustment portion M2, and the transmission unit 12*a* and the reception unit 12*b* are positioned sandwiching the adjustment portion M2.

With the configuration described above, the recording device 2 is capable of creating a state of enabling the imaging unit 15 to perform imagining under a tension condition close to the tension condition at the time of performing recording on the medium M by the recording unit 13, without processing such as providing an opening in the transporting belt 20.

The recording device 2 further includes the accommodation unit 35 configured to accommodate the imaging unit 15 and the reception unit 12*b*.

With the configuration described above, the recording device 2 is capable of suppressing an influence of an external environment where the recording device 2 is installed.

What is claimed is:

1. A recording device comprising:

a recording unit configured to perform recording by ejecting a liquid onto a medium configured to transmit an ultrasonic wave;

a transport unit configured to transport the medium;

an imaging unit configured to capture an image of the medium;

an ultrasonic wave sensor including:

a transmission unit configured to transmit an ultrasonic wave to the medium, and a reception unit configured to receive an ultrasonic wave transmitted by the transmission unit; and a control unit configured to control an operation of the recording unit, based on an imaging result from the imaging unit and a detection result from the ultrasonic wave sensor, wherein the transmission unit and the reception unit are positioned sandwiching the medium, and the reception unit and the imaging unit are positioned adjacent each other on a same side of the medium.

2. The recording device according to claim 1, wherein the transport unit includes a transporting belt having an endless shape, and a first roller and a second roller over which the transporting belt is stretched, the recording unit faces the transporting belt stretched over the first roller and the second roller, the transporting belt has an opening through which an ultrasonic wave transmitted by the transmission unit, is configured to pass, when a portion of the transporting belt that does not have the opening and supports the medium is regarded as a support portion, the support portion is configured to attract the medium, and the ultrasonic wave sensor and the imaging unit are positioned between the first roller and the second roller.

3. The recording device according to claim 2, comprising:

a pressing unit configured to press, against the transporting belt, a part of the medium supported on the support portion, the part being present upstream of the recording unit in a revolving direction of the transporting belt, wherein the imaging unit is configured to capture an image of the medium after passing through the pressing unit, and the ultrasonic wave sensor is configured to detect the medium after passing through the pressing unit.

4. The recording device according to claim 3, comprising:

a supporting member configured to support the transporting belt by sandwiching the transporting belt together with the pressing unit, wherein when the opening is regarded as a first opening, the supporting member has a second opening configured to be in communication with the first opening, the imaging unit and the reception unit are accommodated in the supporting member, the imaging unit is configured to capture an image of the medium exposed from the first opening and the second opening, and the reception unit receives an ultrasonic wave passed through the first opening and the second opening.

5. The recording device according to claim 1, wherein the transport unit includes a transporting belt having an endless shape, the recording device comprises:

an adjustment unit configured to adjust a tension of an adjustment portion, the adjustment portion being a portion of the medium from a holding unit to the transporting belt, the holding unit being configured to hold a roll body around which the medium is wound; and a measurement unit configured to measure a tension of a support portion, the support portion being a portion of the transporting belt supporting the medium, the control unit controls the adjustment unit based on a measurement result from the measurement unit so that the tension of the adjustment portion corresponds to the tension of the support portion, the imaging unit is configured to capture an image of the adjustment portion, and the transmission unit and the reception unit are positioned sandwiching the adjustment portion.

6. The recording device according to claim 5, comprising:

an accommodation unit configured to accommodate the imaging unit and the reception unit.

* * * * *